United States Patent [19]

Frank

[11] Patent Number: 5,372,710
[45] Date of Patent: Dec. 13, 1994

[54] SYSTEM FOR PRODUCING REDUCED PRESSURE ON BOARD OF AN AIRCRAFT

[75] Inventor: Helge Frank, Hamburg, Germany

[73] Assignee: Deutsche Aerospace Airbus GmbH, Hamburg, Germany

[21] Appl. No.: 213,167

[22] Filed: Mar. 14, 1994

Related U.S. Application Data

[63] Continuation-in-part of Ser. No. 850,457, Mar. 10, 1992, abandoned.

[30] Foreign Application Priority Data

Mar. 15, 1991 [DE] Germany ............................ 4108549

[51] Int. Cl.$^5$ ............................................ B64D 11/02
[52] U.S. Cl. ................................. 210/117; 210/120; 210/136; 210/167; 210/188; 210/258; 4/321; 4/431; 244/118.5
[58] Field of Search ............... 244/118.5; 4/431, 432, 4/433, 321; 210/117, 120, 136, 167, 194, 195.1, 252, 257.1, 258, 259, 188, 416.1, 532.2

[56] References Cited

U.S. PATENT DOCUMENTS

| | | | |
|---|---|---|---|
| 3,538,517 | 11/1970 | Cornish et al. | 4/317 |
| 3,835,478 | 9/1974 | Molus | 210/167 |
| 3,922,730 | 12/1975 | Kemper | 210/167 |
| 3,950,249 | 4/1976 | Eger et al. | 210/104 |
| 3,974,075 | 8/1976 | Saigh et al. | 210/86 |
| 3,995,328 | 12/1976 | Carolan et al. | 210/167 |
| 4,063,315 | 12/1977 | Carolan et al. | 4/317 |
| 4,199,828 | 4/1980 | Hellers | 4/431 |
| 4,332,041 | 6/1982 | Kristoffersen | 4/431 |
| 4,346,002 | 8/1982 | Petzinger | 210/218 |
| 4,357,719 | 11/1982 | Badger et al. | 210/767 |
| 4,376,315 | 3/1983 | Badger et al. | 4/431 |
| 4,376,702 | 3/1983 | Small | 210/218 |
| 4,488,963 | 12/1984 | Hellers | 210/218 |
| 4,561,132 | 12/1985 | Lew et al. | 4/431 |
| 4,672,690 | 6/1987 | Sigler | 210/767 |
| 5,133,853 | 7/1992 | Mattsson et al. | 210/532.2 |

FOREIGN PATENT DOCUMENTS 3026763 2/1981 Germany .
285100A 3/1990 Japan .

*Primary Examiner*—Peter A. Hruskoci
*Assistant Examiner*—Robert James Popovics
*Attorney, Agent, or Firm*—W. G. Fasse; W. F. Fasse

[57] ABSTRACT

A system for producing reduced pressure on board of an aircraft cooperates with at least one vacuum toilet for flushing the toilet. A reduced pressure is generated by a pump for transporting of refuse including water waste into a collection tank without using any pressure difference between the pressure in the aircraft cabin and the pressure outside the cabin. The suction inlet of the pump is connected through a filter to the collection tank and the pressure side of the pump is connected to a nozzle in an ejector, the suction inlet of which is connected to the toilet. A funnel-shaped ejector discharge port is connected through a return conduit to the collection tank, preferably through a water separator. A closed water circulating circuit is formed by the pump, the tank, the filter, and the ejector so that refuse and waste water pass directly through the ejector into the tank. A water separator is connected through a waste air discharge pipe or conduit either to a filter for returning the air into the cabin or to a discharge valve through the wall of the aircraft body.

10 Claims, 3 Drawing Sheets

SYSTEM FOR PRODUCING REDUCED PRESSURE ON BOARD OF AN AIRCRAFT

CROSS-REFERENCE TO RELATED APPLICATION

The present application is a continuation-in-part application of U.S. patent application Ser. No. 07/850,457, filed on Mar. 10, 1992, now abandoned.

FIELD OF THE INVENTION

The invention relates to a system for producing reduced pressure on board of an aircraft, especially for operating a vacuum toilet or toilets on board of an aircraft.

BACKGROUND INFORMATION

The reduced pressure in such system is conventionally used to primarily transport refuse from one or more toilet bowls into a refuse collection tank. Such systems must be operable, especially during cruising flight when there is a pressure gradient between the space inside the aircraft body or cabin and the environment.

German Patent Publication (DE-OS) 3,026,763 (Badger et al.), published on Feb. 12, 1981, discloses a vacuum toilet flush system. Incidentally, the German Serial Number 3,026,763 is based on U.S. Ser. No. 58,586, filed in the United States of America on Jul. 18, 1979. In said publication a vacuum is produced either by the environment of the aircraft due to the pressure gradient, or by a vacuum pump. The vacuum provides the force for transporting the refuse to a collection tank system. The vacuum air pump mentioned in the reference is for practical purposes an electrically driven blower which is primarily operated when the aircraft is on the ground, because on the ground the mentioned pressure gradient is not available.

Such a blower has a relatively low efficiency, thereby causing a high energy consumption primarily caused by the high starting currents and operating currents. Keeping these currents within acceptable limits requires in turn an installation that is expensive and adds to the overall weight of the aircraft. Due to the high operational r.p.m. of such blowers, special precautions must be taken for avoiding disadvantages of such blowers. Such blowers are a source of nuisance noise and vibrations. In order to protect the blower against contamination, it is arranged downstream of the refuse collection tank which thus must be strong enough to be safe against implosions. Further, the pressure gradient existing during cruising flight is higher than required for the conveying of the refuse. As a result, the operation of a toilet in such a system involves a high noise level at the toilet inlets and a high air volume consumption. In case of small aircraft, the operation of the toilet in such a system may even cause fluctuations in the cabin pressure.

U.S. Pat. No. 3,995,328 (Carolan et al.), issued on Dec. 7, 1976, shows a vacuum toilet for an aircraft, wherein the collecting tank (40) is connected to two air vacuum pumps (50) and (51) through a water separator (49). Two vacuum suction pumps (50, 51) are connected in parallel with each other, presumably because one pump is insufficient to sustain the required vacuum on both sides of the filter (55) in the chambers (40A) and (40B) of the tank (40). Using such large volume air blowers is undesirable, not only because these blowers are noisy, they also cause undesirable vibrations and use up a substantial amount of power for transporting a sufficient volume of air while the aircraft is on the ground or at low altitudes. At high altitudes the reduced ambient pressure is used to maintain the required vacuum in the system of Carolan et al.

U.S. Pat. No. 4,199,828 (Hellers) issued on Apr. 29, 1990 shows a pneumatic ejector for producing the required vacuum in a toilet, for example, on a bus or train. Such a pneumatic ejector requires for its operation a compressed air reservoir (5) readily available on a bus or train from the respective brake system. The use of a pneumatic ejector (2) of Hellers instead of the vacuum suction pumps in Carolan et al. does not make sense, because the ejector of Hellers needs a source of compressed air for its operation. Besides, Hellers does not teach nor suggest passing the waste water directly through the ejector.

OBJECTS OF THE INVENTION

In view of the foregoing it is the aim of the invention to achieve the following objects singly or in combination:

to provide a vacuum transport system for refuse on board of an aircraft that avoids the above outlined problems, more specifically, that assures a low noise operation with a high efficiency;

to avoid the need for dimensioning the refuse collection tank for reduced pressure operation nor for excess pressure operation;

to avoid the need for any reduced pressure operation of the refuse collection tank, even if the aircraft is on the ground; and to use an ejector in a closed waste water circulation so that the waste water passes through the ejector into a collection tank.

SUMMARY OF THE INVENTION

The refuse collection system according to the invention comprises a water pump connected with its suction inlet, e.g. through a suction conduit, to a waste water filter in a refuse or waste water collection tank and with its compression outlet to an ejector which is connected with an ejector discharge port to the collection tank, thereby forming a closed water circulation circuit to which a toilet or the like is connected at an ejector suction inlet. The filter is preferably a multiple tube filter arranged inside the collection tank. The pressure outlet port of the pump is connected preferably through a compression conduit to a nozzle inlet of the ejector. A discharge funnel of the ejector is connected through a return conduit to an inlet of the collection tank to complete the closed water circulating circuit. A water-air separator connects the collection tank with a waste air discharge conduit or pipe. The entire conduit system is such that the reduced pressure or suction is available at the suction inlet of the ejector so that the waste water circulates directly through the ejector.

Preferably, the ejector discharge funnel or port is connected through the water separator to the collection tank.

This type of construction according to the invention has the advantage that the refuse collection tank is not required to operate under reduced pressure, nor under excess pressure at any time so that it may be dimensioned for operation under normal atmospheric pressure conditions. It is also not necessary to establish reduced pressure repeatedly when the aircraft is on the ground.

The closed waste water circulation circuit directly through the ejector has the further advantage of an efficient operation independently of any cabin-outside pressure differential and without reliance on noisy vacuum air pumps, while actively circulating the waste water repeatedly through the waste water filter.

In a first embodiment in which an air filter positioned downstream of the water separator cleans the air from the collection tank sufficiently for discharging the filtered air into the cabin space, whereby openings through the aircraft body wall are avoided.

In a second embodiment which avoids the use of an air filter, waste air is discharged from the collection tank into the environment through a tank venting valve in the aircraft body wall with the advantage of avoiding the costs for filtering the waste air from the collection tank. A cabin vent is preferably combined with the venting of the collection tank, whereby a non-return cabin venting valve and the tank venting valve are operated in response to the cabin pressure or manually.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
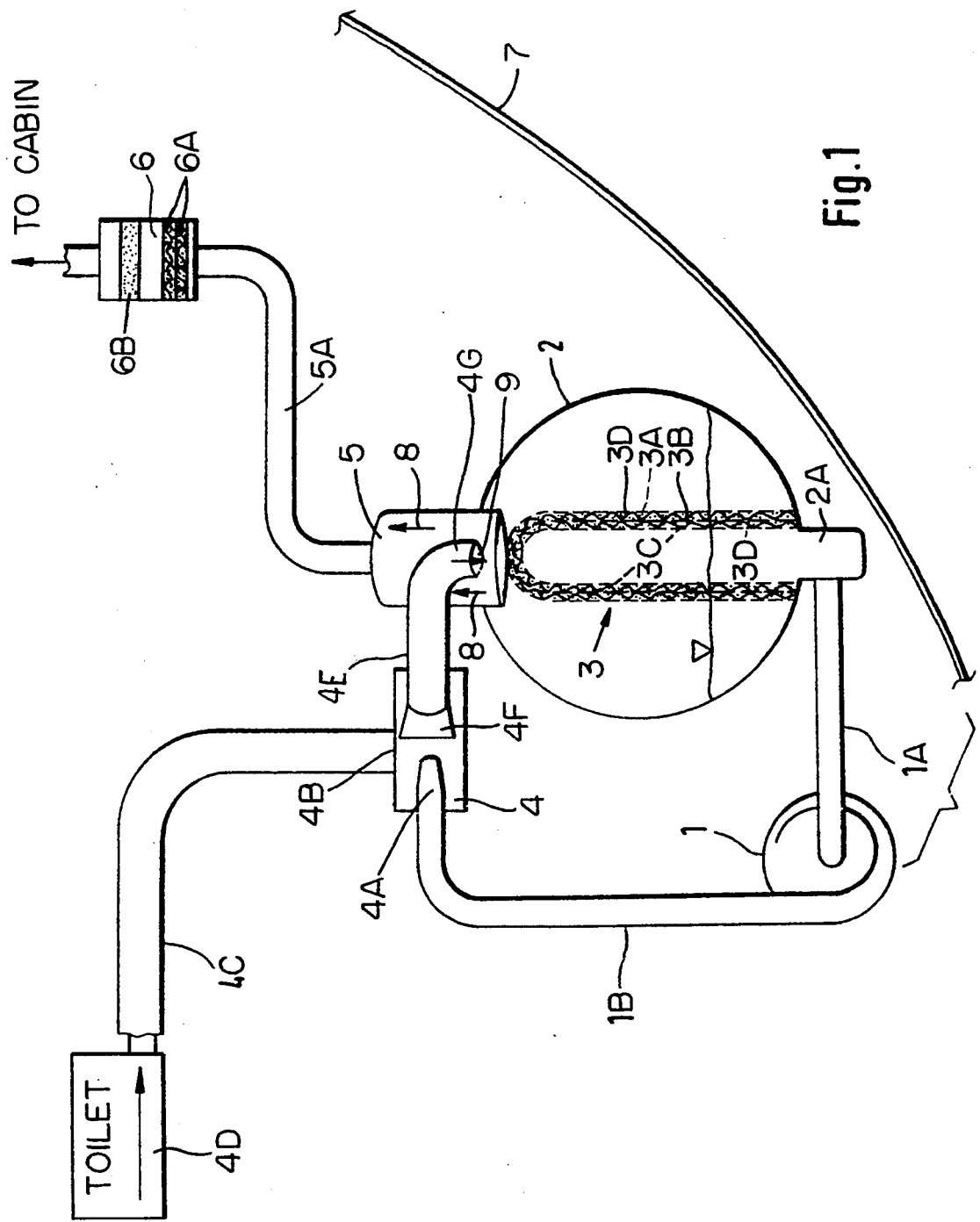
FIG. 1 is a schematic view of the present system with a waste air filter permitting the return of cleaned air into the cabin.
Figure 2:
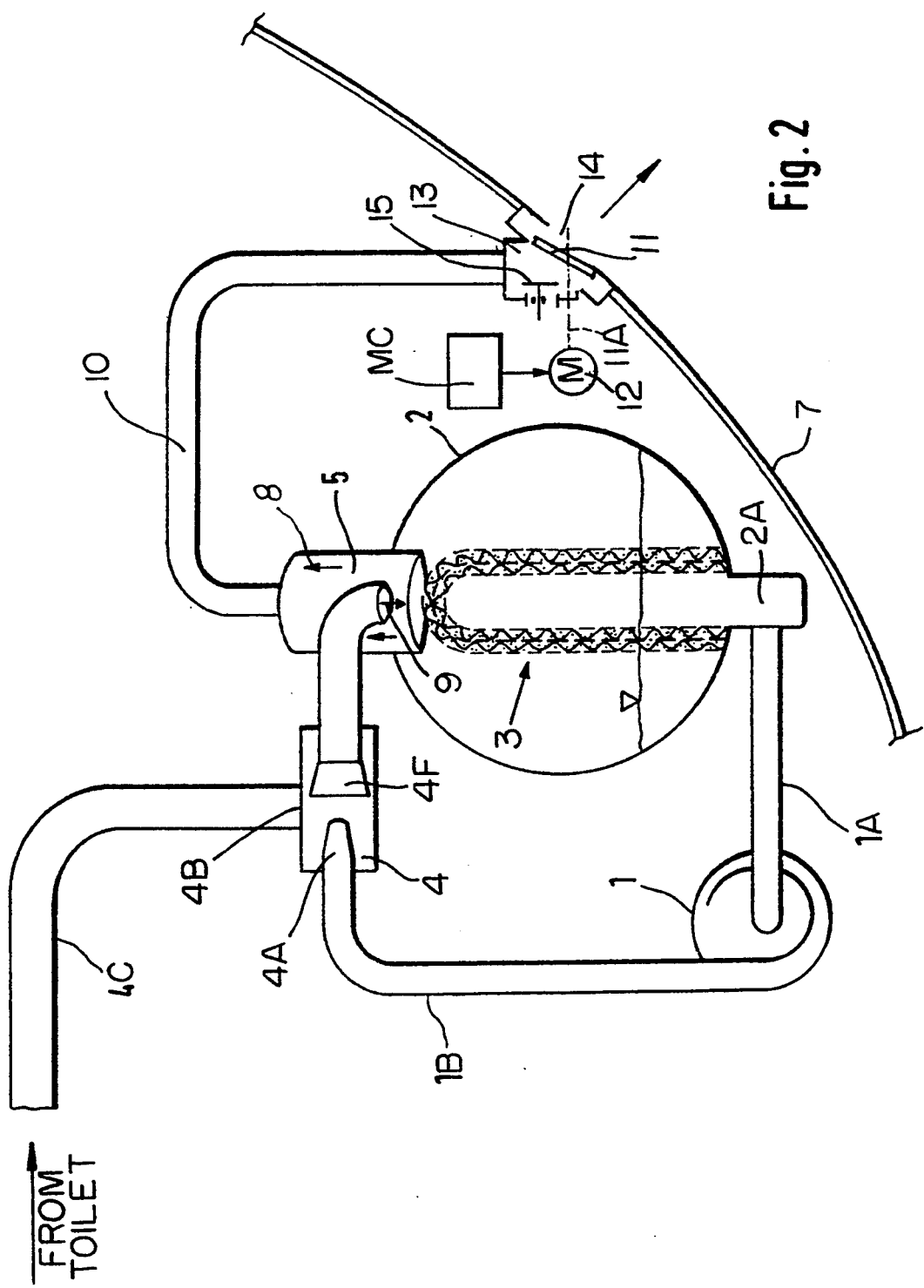
FIG. 2 is a view similar to that of FIG. 1, but showing an embodiment with a waste air discharge outside of the aircraft body.

The system according to the invention as shown in FIGS. 1 and 2 comprises a water pump 1 connected through a suction conduit or pipe 1A to a suction port 2A of a waste collection tank 2 having mounted therein a waste filter 3. The filter 3 is, for example, so arranged that the suction pipe 1A connects through the port 2A and the inside of the filter 3 into the tank. However, the arrangement may also be such, that the refuse flows into the filter and the suction port is connected directly to the tank rather than through the filter to the tank. Preferably, the filter 3 is a multiple tube filter having several wire mesh tubes 3A, 3B, 3C arranged concentrically and coaxially with spaces between neighboring tubes filled with filtering material 3D. The wire mesh tubes 3A, 3B, 3C are preferably made of stainless steel wire mesh. The compression output of pump 1 is connected through a compression pipe or conduit 1B to a nozzle inlet port 4A leading into an ejector 4. A suction inlet 4B of the ejector 4 is connected through an air intake pipe 4C to a toilet 4D. A return flow duct 4E connects a funnel discharge port 4F of the ejector 4 to the waste collection tank 2 to form a water circulating closed circuit into which the ejector 4 is connected with its inlet port 4A and with its exit port 4F. Thus, the waste water flows from the toilet directly through the ejector 4 into the tank 2. For this purpose the return duct 4E has a discharge end 4G leading into the tank 2. Preferably, the discharge end 4G is a downwardly facing pipe elbow positioned in axial alignment with the filter 3 so that the filter surface of the filter 3 is efficiently exposed to the waste water discharged from the pipe elbow 4G. The waste water must flow axially downwardly along the filter surface whereby a tendency of the water portion of the waste to flow into the filter is advantageously used, while the solids portion of the waste slides down along the filter wall.

The tank 2 is connected through a water-air separator 5 and through a waste air discharge pipe 5A to an air filter 6 for discharging cleaned air into the aircraft cabin enclosed by the aircraft body 7. The air filter 6 comprises a plurality of filter material layers 6A for removing solid particles and at least one active charcoal filter layer 6B for removing odor components from the air coming out of the waste collection tank 2.

The water-air separator 5 preferably has a downwardly open bottom arranged above and in axial alignment with the filter 3 and the waste water discharge elbow 4G preferably passes through the waste water separator so that air coming in with the waste water will tend to enter into pipe 5A as indicated by the arrows 8 while waste water passes downwardly onto the filter 3 as indicated by the arrow 9.

The reduced pressure caused in the injector 4 by the flow through ejector nozzle inlet port 4A is available at the suction inlet 4B of the ejector 4. This suction is applied through the intake pipe 4C to the toilet 4D. The system may comprise several toilets, whereby the arrangement is such that the waste from all toilets flows directly through the ejector 4 into the tank 2.

When an electric pump motor that drives the water pump 1 is switched on, the system is operational. The electric pump motor is not shown. The system is switched on when needed on the ground or when the reduced pressure outside the aircraft is inadequate. The filtered waste water flows from the refuse or waste collection tank 2 through the filter 3, the water pump 1, to the ejector 4 from which the water exits through the funnel 4F into the return flow duct 4E back into the collection tank 2 thus completing the closed circulating circuit. As the water jet exiting from the nozzle inlet port 4A passes through the ejector 4, it entrains air so that the required reduced pressure or suction is established in the air intake 4B of the ejector 4. The power of the motor driving the water pump 1 is selected to be adequate for establishing the necessary suction. Air accumulated in the tank 2 passes through the conventional water separator 5 and through the waste air discharge conduit 5A into the air filter 6 and from the filter 6 into the space enclosed by the aircraft body 7.

As described the filter 6 is so constructed that it removes suspended solids and odor components. For this purpose, the several layers of filter material 6A have such mesh or screen sizes that all solid particles are entrapped, while the at least one active charcoal layer 7B assures the odor removal.

The water pump 1 is, as mentioned, an electrically driven pump, preferably of the centrifugal or rotary type. Such a pump for transporting water runs more quietly than the conventional air blowers. Additionally, such a pump requires less space than an air blower. A centrifugal pump also has a lower power consumption, because its transport of a substantially lower volume of liquid is more efficient than the transport of large air volumes by an air blower. Hence, the rotary pump requires less energy for achieving the same effect. The operational r.p.m. of the pump is lower than that of a corresponding air blower, so that the likelihood of a rotor blow-out is not critical for dimensioning the present system.

Another advantage of the present system is seen in that during cruising flight there is no unnecessary high loss of air conditioned cabin air as is the case in systems which use the pressure gradient between the cabin and the environment at high altitudes for the operation of the system. Yet another advantage is seen in that the wall of the collection tank 2 is practically not exposed to any pressure difference, whereby the tank can be constructed correspondingly light, thereby achieving an advantageous tank weight and substantial cost reductions.

FIG. 2 illustrates an embodiment similar to the one described with reference to FIG. 1, however, the air filter 6 of FIG. 1 has been replaced by an outside discharge valve 11 connected through an opening 14 in the wall 7 of the aircraft body. The valve 11 is, for example, constructed as a flap valve operated by a motor 12. The motor 12 is controlled by a motor control MC which in turn is responsive, for example, to the pressure inside the aircraft cabin as will be described in more detail below with reference to FIGS. 3 and 4.

An air discharge conduit 10 leads from the water-air separator 5 to a valve chamber 13 normally closed to the outside by a discharge valve 11. A non-return valve 15 leads through a wall of the chamber 13 for venting the cabin through the chamber 13 and through the opening 15 in the body wall 7 when the discharge valve 11 is opened.

The discharge valve 11 and the non-return valve 15 are part of the cabin pressure control system, which makes sure that a certain proportion of the cabin air volume is continuously discharged to the outside through the cabin wall 11 and replaced by fresh air. For this purpose, the valve 11 is automatically controlled by the motor 12 which drives a mechanical coupling 11A in response to the motor control MC which takes into account the varying operating conditions of the air conditioning system of the aircraft. As a result, the cabin air discharge and exchange depends on these operating conditions. In order to assure an optimal cooperation of the present waste handling system with the discharge valve 11, the non-return valve 15 is so dimensioned that the air pressure in the chamber 13 corresponds practically to the air pressure within the cabin enclosed by the aircraft body wall 7. As a result, air coming from the cabin and air coming through the conduit 6A are both discharged through the valve 11 to the outside of the cabin if valve 11 is opened.

Figure 3:
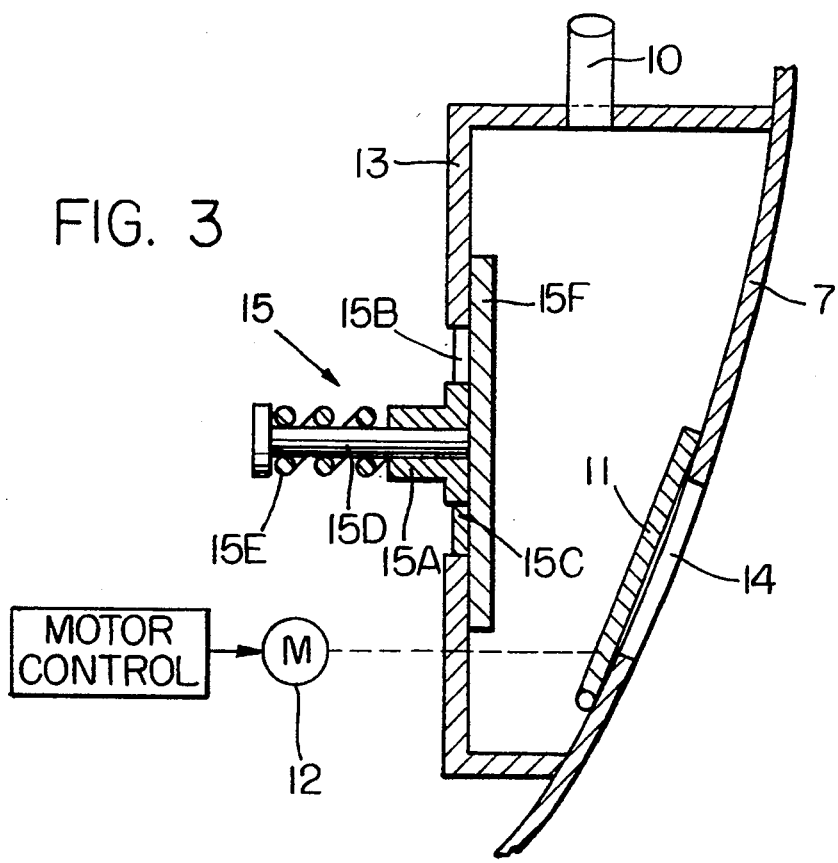
FIG. 3 is an enlarged view of the venting device of FIG. 2 with the venting valves closed.
Figure 4:
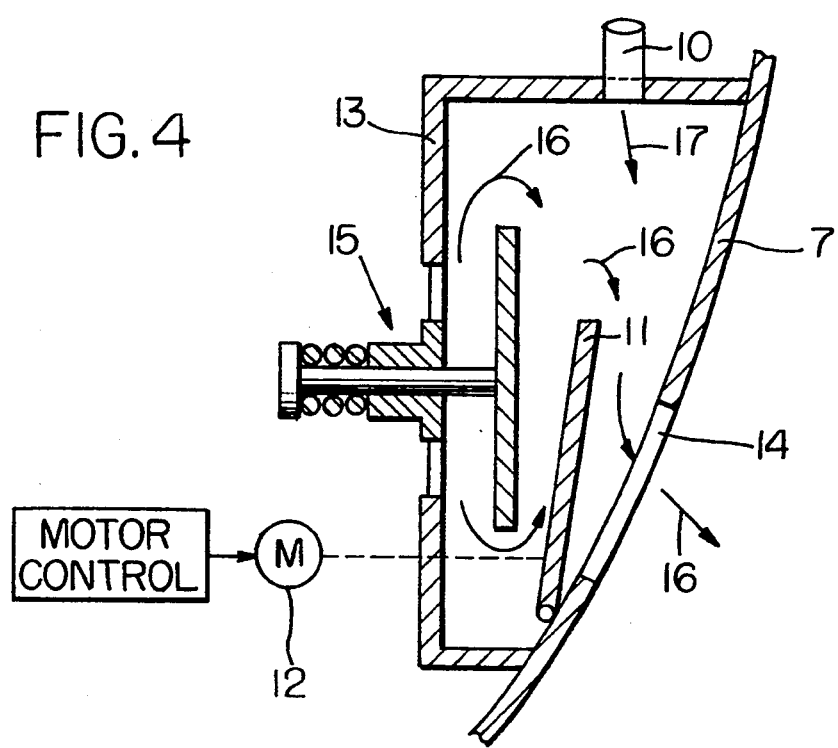
FIG. 4 is a view as in FIG. 3 with the venting valves open.

Referring to FIGS. 3 and 4, valves 11 and 15 are closed in FIG. 3 and open in FIG. 4. The non-return valve 15 has a central bushing 15A mounted in a hole 15B in the wall of the chamber 13 by ribs 15C extending radially out from the bushing 15A and connected to the chamber wall similar to spokes of a wheel that secure a hub to a wheel rim. Thus, the bushing 15A is fixed to the chamber wall. A valve stem 15D is slidable in the bushing 15C and biased by a spring 15E into the valve closing position of FIG. 3, whereby a valve disk 15F is pressed against the inner wall of the chamber 13 thereby closing the hole or holes 15B in a sealed manner. The biasing spring 15E is so dimensioned that the valve 15 is normally closed and any excess pressure in the chamber 13 also holds the valve 15 closed. However, when the flap valve 11 is opened by the motor 12, suction develops inside the chamber 13 at sufficiently high altitudes and that suction is strong enough to also open the valve 15 against the bias of the spring 15E for venting the cabin and the tank 2.

In FIG. 4 arrows 16 show the flow of air through both open valves. Arrow 17 indicates an air flow through duct 10 from chamber 2 which is thus also vented.

FIGS. 1 and 2 show the filter 3 centrally in the tank 2, so that the waste liquid and solids flow onto the outer filter surface and filtered water is withdrawn at 2A from the inside of the filter 3. However, it is also possible to introduce the waste liquid and solids inside the filter and withdraw filtered water from the tank outside the filter.

Although the invention has been described with reference to specific example embodiments, it will be appreciated that it is intended to cover all modifications and equivalents within the scope of the appended claims.

What I claim is:

1. A system for producing reduced pressure for operating a toilet on board of an aircraft, comprising a toilet, a refuse collection tank, a water pump for transporting refuse from said toilet into said collection tank by suction produced by a water flow caused to circulate by said water pump, a suction conduit connecting a suction inlet of said water pump to said collection tank, a waste filter positioned in said collection tank so that waste water from said tank must flow through said waste filter into said suction conduit for preventing refuse from entering into said water pump, a compression pipe connected to a pressure outlet of said water pump, an ejector comprising a suction inlet connected to said toilet, a jet nozzle inlet connected to said compression pipe of said water pump, and a discharge port, a water return conduit connecting said discharge port of said ejector to said collection tank to form a water circulation closed circuit in which said ejector is connected in series with said nozzle inlet and with said discharge port, said ejector driven by said water pump producing a suction for generating at said suction inlet of said ejector a reduced pressure, sufficient for transporting of said refuse from said toilet through said ejector into said collection tank, a water-air separator connected to said refuse tank, and an air exhaust duct connected to said water-air separator for discharging waste air from said collection tank, wherein said water pump is adapted for maintaining a closed circuit water flow for generating said suction in said ejector and for passing waste water through said waste filter.

2. The system of claim 1, wherein said suction inlet of said ejector is directly connected to a plurality of toilets.

3. The system of claim 1, wherein said suction conduit is connected to a space inside said waste filter in said collection tank, so that water must pass through said waste filter into said water pump.

4. The system of claim 1, further comprising an air filter connected to said air exhaust duct for filtering said waste air, said air filter having a clean air discharge port.

5. The system of claim 4, wherein said clean air discharge port is leading into a cabin on board of said aircraft.

6. The system of claim 1, further comprising an aircraft body with a wall and an air opening in said wall, an air discharge valve connected to said wall opening, and a venting pipe connecting said discharge valve to said collection tank for discharging air from said collection tank to the outside.

7. The system of claim 6, further comprising a valve chamber connected to said venting pipe and a non-return valve in said valve chamber for preventing air from entering into said system from the outside.

8. The system of claim 1, wherein said water return conduit connecting said discharge port of said ejector to said collection tank is connected through said water-air separator to said collection tank.

9. The system of claim 8, wherein said waste filter is positioned in said waste tank in alignment with said water-air separator so that waste water is discharged from said water air separator directly onto said waste filter.

10. The system of claim 9, wherein said waste filter is an elongated multiple tube filter having a longitudinal axis extending below said water-air separator and in axial alignment with said water-air separator so that waste water discharged axially onto an upper end of said multiple tube filter must flow downwardly along sides of said multiple tube filter into said tank.

* * * * *